March 8, 1955     C. A. SHANK ET AL     2,703,679
ELECTRONIC TEMPERATURE REGULATOR
Filed July 22, 1949     2 Sheets-Sheet 1
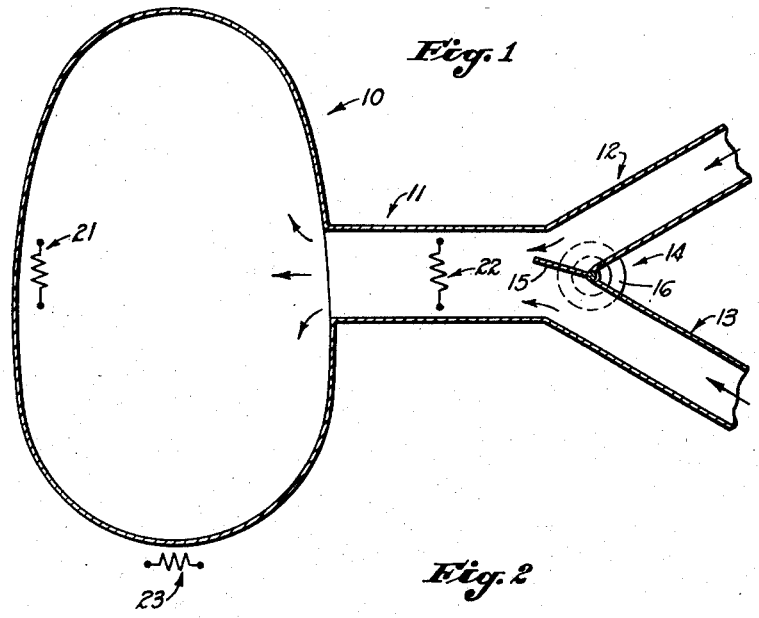
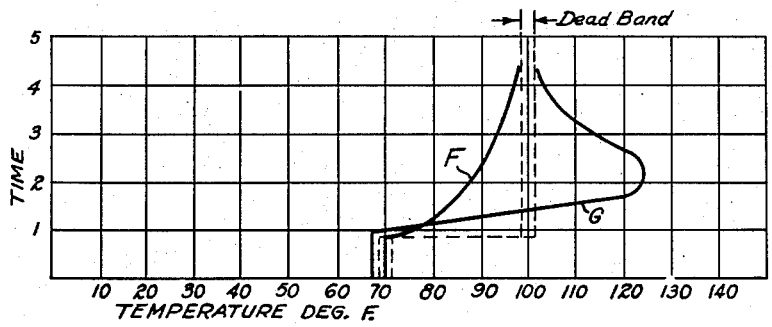
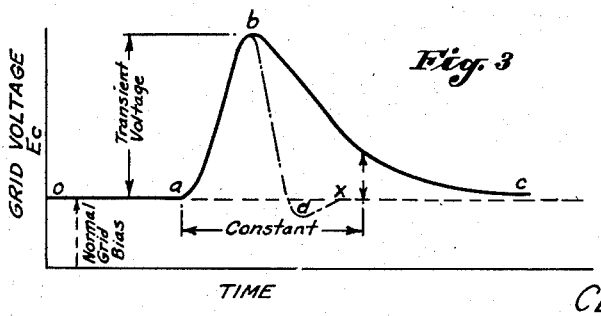
INVENTORS:
CLIFFORD A. SHANK
NORMAN M. BROWN JR.
By THEIR ATTORNEYS
HARRIS, KIECH, FOSTER & HARRIS
By Ward D. Foster

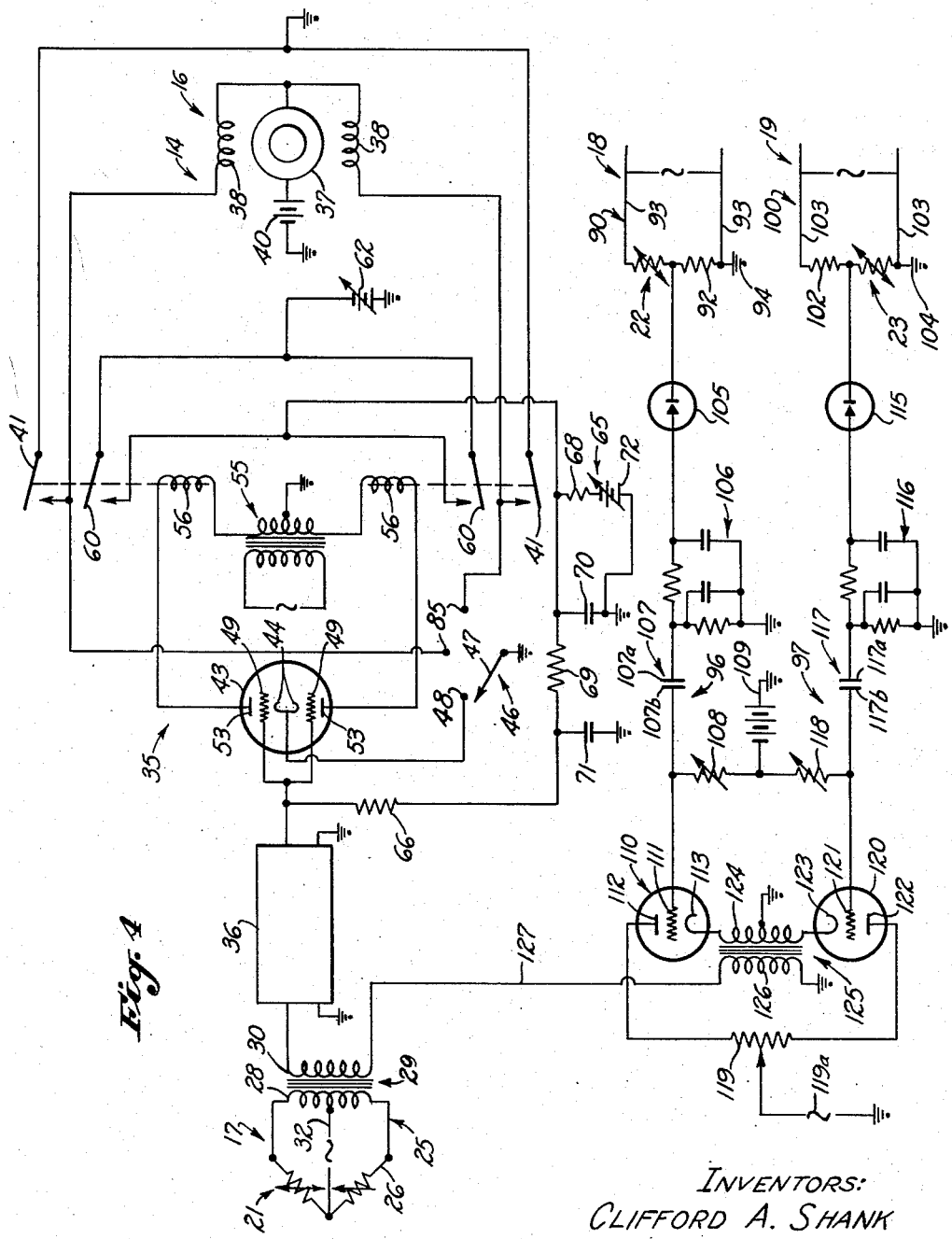

United States Patent Office 2,703,679
Patented Mar. 8, 1955

2,703,679

ELECTRONIC TEMPERATURE REGULATOR

Clifford A. Shank, Redondo Beach, and Norman M. Brown, Jr., Los Angeles, Calif., assignors to The Garrett Corporation, Los Angeles, Calif., a corporation of California Application July 22, 1949, Serial No. 106,236

14 Claims. (Cl. 236—9)

Our invention relates in general to regulating apparatus and, more particularly, to a regulating apparatus adapted to control characteristics of a fluid in a chamber having a fluid duct connected thereto.

In order to facilitate the description of the component parts of the apparatus and the manner in which they function, the apparatus will be described as controlling the temperature of the air in a chamber having an air inlet duct connected thereto, said inlet duct being provided with means for controlling the air temperature of the air entering the chamber through the inlet in accordance with the changing air temperature conditions. However, it will be understood that the regulating apparatus, which is the subject of our invention, is adapted to control other variables encountered in the regulation of fluids and it is not intended that the invention be limited to the control of the temperature of a fluid. For instance, the regulating apparatus about to be described could be utilized to control the pressure of the air in the chamber, or the pressure of a gas other than air.

For illustrative purposes, the chamber will be considered as the cabin of an airplane having an air inlet duct which is supplied with hot and/or cold air from separate hot air and cold air ducts through a temperature control means, the latter comprising a control valve adapted to regulate the relative rates of flow of hot and cold air into the inlet duct. The control valve may be operated by a reversible actuator, such as an electric motor or other suitable device, connected thereto.

Although we have indicated that the means utilized to control the air entering the cabin from the air inlet duct is a control valve which blends the input of separate hot and cold air ducts, it is conceivable that the temperature of the air entering the air inlet duct could be otherwise controlled as, for instance, by initially varying the temperature of the air entering the inlet duct and thus eliminating the control valve.

It is, therefore, a primary object of our invention to provide a regulating apparatus for controlling a condition in a chamber which includes primary circuit means incorporating an element sensitive to variances in said condition and situated in said chamber, said primary circuit means being modulated by the action of either or both of a pair of secondary circuit means, one of the latter having an element sensitive to variances in said condition situated in a duct leading to the chamber and the other having a similar element located in a medium outside the chamber.

It is a further object of our invention to provide an apparatus of the aforementioned type in which the modulation of the primary circuit means by the secondary circuit means will be so accomplished that variances from the norm of the condition in the chamber due to variances of said condition within the duct or without the chamber will be rapidly compensated for and the chamber condition will be maintained at the norm without hunting of the regulating apparatus.

It is an additional object to provide a secondary circuit means for modulating the output signals of a floating-control type of primary circuit means, the secondary circuit means providing a transient modulating signal having a fixed time constant and an amplitude proportional to the extent of the variance of the condition from the predetermined norm at the secondary circuit means sensing element.

A further object of our invention is the provision of a plurality of secondary circuit means of the aforementioned type wherein the resultant modulating signal applied to the primary circuit means is the algebraic sum of the several transient modulating signals provided by the several secondary circuit means, and the resultant signal of the primary and secondary circuit means is the algebraic sum of the primary and the resultant modulating signals.

A further object of our invention is the provision for the primary circuit means of a floating-control type condition regulator, of a secondary modulating circuit means adapted to impress a transient modulating signal on the primary circuit means, the transient signal existing for a fixed period of time regardless of the nature or amplitude of the change in said condition initiating the transient signal but the amplitude of the transient signal being a function of the extent of the change initiating the modulating signal.

It is another object of our invention to provide a temperature regulating apparatus of the aforementioned nature which will respond to temperature variations in the ambient air surrounding the cabin and which will compensate for such variations by changing the position of the temperature control valve so as to change the relative flow rates of air into the inlet duct from the hot and cold air ducts.

A further object of our invention is the provision of a temperature regulating apparatus which is adapted to make corrections for temperature variations more rapidly than has hitherto been possible and in which the rapidity with which compensations for temperature changes in the cabin, the inlet duct, and/or the ambient air are made, is a function of the extent of the temperature change to be compensated. Thus, the rate at which the correction is made is a function of the extent of the temperature change encountered.

An additional object of our invention is the provision of an apparatus for regulating the temperature of the air within a cabin having an inlet duct which includes a first anticipator circuit incorporating a second temperature-sensitive resistor, the second temperature-sensitive resistor being located in the duct and being adapted to generate a signal which is delivered by the first anticipator circuit to the output side of the primary circuit to modulate the signal which is delivered by the first temperature-sensitive resistor in the primary circuit.

A further object of our invention is the provision of an apparatus for controlling the temperature of a cabin which includes a second anticipator circuit incorporating a third temperature-sensitive resistor located externally of the cabin in the ambient air surrounding the cabin and adapted to deliver the signal generated by said third temperature-sensitive resistor to the output side of said primary circuit to modulate the signal emitted by said first temperature-sensitive resistor.

A further object of our invention is the provision of a temperature regulating apparatus which includes electronic means connecting the reversible actuator of the valve in the inlet duct and the output of the aforementioned primary bridge circuit for energizing the actuator in a direction determined by the signal of the primary bridge as modulated by the first and second anticipator circuits, i. e., in a direction determined by the resultant of the signals emitted by the three circuits.

A further object of our invention is the provision of a temperature regulating apparatus wherein the control valve actuator is energized intermittently by current pulses whose frequency and length vary directly with variations in the magnitude of the resultant signal produced by the bridge and anticipator circuits, that is, with the magnitude of the net unbalance of the circuits.

A further object of our invention is the provision of a temperature regulating apparatus having a primary bridge circuit the output of which is adapted to be modulated by two anticipator circuits, modulation of the output of the primary bridge circuit by said two anticipator circuits being adapted to prevent hunting of the control valve actuator of the control means and thus reducing fluctuations in temperature and also wear upon the motor of the actuator.

An additional object of our invention is the provision of a temperature regulating apparatus by means of which rapid voluntary temperature changes within the cabin can be accomplished since the use of the modulating anticipators permits the temperature of the air in the inlet duct to be raised sufficiently to bring the air in the cabin up to the desired temperature in a very short period. Thus, when it is desired to reach a new cabin temperature higher than that previously obtained in the cabin, the temperature of the air in the inlet duct is raised a substantial amount above the temperature which it is desired to reach in the cabin and is only reduced when the temperature in the cabin begins to approach the desired temperature.

A further object of our invention is to provide an apparatus wherein the electron tube means includes a pair of plates respectively associated with the control grids and connected to a source of alternating potential of the same frequency as the bridge circuit so that an electric current will be established in one or the other of the plate circuits of the electron tube means, depending upon the direction of net unbalance of the resultant signal.

The foregoing objects and advantages of the present invention, together with various objects and advantages thereof which will become evident in the light of the detailed disclosure that follows, may be attained through employment of the exemplary embodiment of the invention which is illustrated in the accompanying drawings and which is described in detail hereinafter. Referring to the drawings:

Fig. 1 is a diagrammatic view illustrating an application of the invention to an apparatus for regulating the air temperature in an airplane cabin;

Fig. 2 is a graph illustrating one phase of the operation of our temperature regulating apparatus;

Fig. 3 is a graph illustrating another phase of the operation of our temperature regulating apparatus; and Fig. 4 is a schematic wiring diagram of the temperature regulating apparatus of our invention.

Referring particularly to Fig. 1 of the drawings, the numeral 10 designates an airplane cabin as viewed in cross section, air being delivered to the cabin through an inlet duct 11 which receives hot air from a duct 12 and cold air from a duct 13. The hot air duct 12 may be connected to the outlet of a suitable heater (not shown) and the cold air duct 13 may receive air from a refrigeration system or from without the airplane. The relative rates of flow of hot and cold air into the inlet duct are determined by a control means 14 for said duct, the control means including a proportioning valve 15, the position of which regulates the temperature of the air in the inlet duct, and a reversible electric motor 16 which is connected to said proportioning valve in any suitable manner, as by conventional reduction gearing (not shown). Although the reversible actuator 16 has been described as an electric motor, it will be understood that other reversible devices may be employed. For example, a reversible hydraulic motor or other similar means may be connected to the control valve 15.

The temperature regulating apparatus of the invention includes a primary signal emitting circuit 17, as best shown in Fig. 4 of the drawings, a first modulating or anticipator circuit 18 and a second modulating or anticipator circuit 19. Included in the primary signal emitting circuit 17 is a temperature-sensitive element 21, while temperature-sensitive elements 22 and 23 are, respectively, incorporated in the first and second anticipator circuits 18 and 19. As best shown in Fig. 1, the temperature-sensitive element 21 is mounted within the interior of the airplane cabin 10, the second temperature-sensitive element 22 is mounted in the inlet duct 11 and the third temperature-sensitive element 23 is mounted externally of the cabin 10. In actual practice, the temperature-sensitive element 21 in the cabin 10 may comprise a plurality of such elements suitably connected electrically, but it will be regarded as one element herein for convenience. The same may also be true of the temperature-sensitive elements 22 and 23.

The temperature-sensitive elements 21 to 23 comprise resistors whose resistances are variable with the variations in the temperature thereof and various elements of this type, such as thermistors, may be employed. These temperature-sensitive elements are so designed as to be capable of responding rapidly to temperature variations in the air in which they are located, that is, variations in the temperature of the air surrounding them. Thus, the first temperature-sensitive element 21 is adapted to have its resistance vary with variances in the temperature of the air within the cabin 10, the second temperature-sensitive element 22 is adapted to have its resistance vary with variations in the temperature of the air within the inlet duct 11 and the third temperature-sensitive element 23 is adapted to have its resistance vary with variations in the temperature of the ambient air surrounding the cabin.

As will be discussed in more detail hereinafter, the rates of response of the temperature-sensitive resistors 21, 22, and 23 are substantially of the same order of magnitude, but there is no necessity for carefully matching and adjusting the characteristics of the individual resistors with the other resistors with which they are associated because the inherent characteristics of the temperature regulating apparatus obviate the need for such matching and adjustment.

The primary signal emitting circuit 17 is exemplified as a primary bridge circuit 25, the first temperature-sensitive resistor 21 forming one arm of the bridge, a manually adjustable control resistor 26 forming another arm of the bridge, and the primary 28 of a transformer 29 constituting the remaining arms of the bridge and being the output side of said bridge. The control resistor 26 is adapted to have its resistance varied at will to adjust the bridge 25 to establish the temperature of the air within the cabin at a predetermined norm. The bridge circuit 25 is connected to a suitable source of alternating current by leads 32, one of the leads being connected to the bridge between the temperature-sensitive element 21 and the control resistor 26 of the bridge while the other of the leads is connected to the output side 28 of said bridge.

When the primary bridge 25 has been adjusted to maintain the temperature of the air within the cabin 10 at a predetermined norm by manually setting the control resistor 26, any variance in the temperature of the air within the cabin 10 will result in a corresponding variance in the resistance of the resistor 21 and will cause a signal to be generated thereby and delivered to the output side of the bridge as constituted by the primary 28 of the transformer 29. A signal imposed upon the primary 28 of the transformer 29 is adapted to induce a corresponding signal in the secondary 30 of the transformer 29 and to activate, in a manner which will be described in greater detail below, an electronic control circuit 35 whose activation governs the energization of the electric actuator 16 of the control means 14 for the inlet duct 11. It should be noted that an amplifier 36 is interposed between the electronic control circuit 35 and the output side of the bridge circuit 25 and that said output side of the primary bridge is connected to the bridge between the temperature-sensitive resistor 21 and the control resistor 26. Thus, the primary bridge circuit 25 is adapted to generate a signal which will be transmitted to the electronic control circuit 35 to activate the same and cause the energization thereby of the actuator motor 16 of the control means 14 for the inlet duct 11.

Considering, in greater detail, the electronic control circuit 35 and the control means 14 which is adapted to be energized thereby, the reversible electric motor 16 includes an armature 37 and opposed field windings 38 which are adapted to be energized by a battery 40, one side of the latter being grounded for convenience. Each of the field windings 38 is connected to ground through a normally open switch 41 which is controlled by the electronic means 35 as will be discussed in more detail hereinafter. As will be apparent, the direction of energization of the reversible motor 16, and the direction of movement of the control valve 15, depends on which of the switches 41 is energized. It will be understood that although the reversible motor 16 is shown as being a direct current motor, it may be an alternating current motor if desired.

Considering the electronic means 35 in more detail, it includes electron tube means which is shown as a duo-triode 43 although it will be understood that other electron tubes, such as two triodes or multi-grid tubes, may be employed as is well known in the art. The duo-triode 43 includes a pair of connected cathodes 44 which are adapted to be grounded through a switch 46 when a movable contact 47 of this switch engages a stationary contact 48 thereof. The grids 49 of the duo-triode 43 are connected to the output side of the bridge circuit 25 through the amplifier 36 so that any output signal produced by the bridge circuit is applied to the grids, such output signal being either positive or negative depending on the direction of unbalance of the bridge circuit and also depending on whether the alternating potential applied to the bridge circuit is positive or negative. In other words, the signal applied to the grids 49 will be alternately positive and negative if the bridge circuit is unbalanced in one direction, and will be alternately negative and positive if the bridge circuit is unbalanced in the other direction.

The duo-triode 43 includes two anodes or plates 53 which are respectively connected to opposite ends of the secondary winding of a transformer 55 through the windings of the relays 56, the secondary of the transformer being center tapped to ground. It will be understood that a balanced differential relay may be substituted for the two separate relays 56 if desired. The primary winding of the transformer 55 is connected to a source of alternating potential of the same frequency as that of the alternating potential applied to the bridge circuit 25. Preferably, the primary of the transformer 55 is connected to the same source as the bridge circuit 25, although it may be connected to a source of alternating potential which is 180° out of phase with the alternating potential applied to the bridge. As will be noted, the relays 56 respectively control the switches 41 in series with the field windings 38 of the reversible motor 16, the switches 41 normally being open and being closed by the respective relays when the latter are energized.

Considering the operation of the electronic means 35 as thus far described, it will be apparent that when the net unbalance of the bridge circuit is in one direction, the signal applied to the grids 49 may be regarded as positive during the first half-cycle of the alternating potential applied to the bridge circuit and may be regarded as negative during the second half-cycle. During the first half-cycle of the alternating potential applied to the bridge circuit, i. e., during the interval that the signal applied to the grids 49 is positive, one of the plates 53 will be positive and the other negative. Consequently, during the interval that a positive signal is applied to the grids, an electric current will flow in the plate circuit having the positive plate to energize the corresponding relay 56, thereby energizing the motor 16 in one direction. With the net unbalance of the bridge circuit in the direction under consideration, it will be apparent that no current will flow in either plate circuit during the negative half-cycle of the alternating potential applied to the bridge circuit because of the fact that both grids 49 will be negative. As will be pointed out hereinafter, a negative bias can be applied to the grids 49 so that the plate current of the duo-triode 43 is less than that required for energization of the relays 56, i. e., is less than the relay pull-in current, when the net resultant signal from the bridge circuit is zero.

As previously mentioned, an object of the present invention is to secure intermittent energization of the motor 16 during any unbalance of the bridge circuit so that the control valve is moved in a step-by-step manner. This is accomplished by applying a variable negative bias to the grids 49 of the duo-triode 43 as will be discussed in the following paragraphs.

Continuing to refer to Fig. 4 of the drawings, in addition to controlling the switches 41, the relays 56 respectively control switches 60 which are normally open and which are adapted to be closed by the respective relays when energized. The switches 60 are connected in parallel so that closure of either one energizes the biasing circuit suggested above. This biasing circuit includes a source 62 of potential, exemplified as a battery, one side of which is grounded, connected in series with the switches 60, the potential source 62 being indicated as variable for a reason to be considered hereinafter. When either of the switches 60 is closed, the variable-potential source 62 applies a negative potential to the grids 49 of the duo-triode 43 through a resistor-condenser network 65 and an isolating resistor 66, the purpose of the isolating resistor being to prevent by-passing of the resultant signal of the primary bridge circuit 25. The network 65 includes two resistors 68 and 69 and two condensers 70 and 71, the resistor 69 being connected in series in the biasing circuit and the resistor 68 and the condensers 70 and 71 being connected to ground as shown. For a reason which will be discussed hereinafter, the resistor 68 is grounded through a variable-potential source 72.

Considering the operation of the biasing circuit, it will be apparent that whenever either of the relays 56 is energized by a flow of current in its plate circuit, it will close the corresponding switch 60 to energize the biasing circuit, thereby applying a negative potential to the grids 49 which opposes any positive potential applied thereto in the manner hereinbefore described by an unbalance in the bridge circuit. As will be apparent, because of the employment of the resistor-condenser network 65, the negative bias applied by the potential source 62 to the grids in this manner builds up gradually until ultimately the plate current of the duo-triode 43 decays to the relay drop-out current, whereupon the energized relay 56 is de-energized so that the switches 41 and 60 controlled thereby open to de-energize the biasing circuit and the motor 16. Subsequently, the negative bias applied to the grids bleeds off slowly through the network 65 until the plate current of the duo-triode 43 increases again to the relay pull-in current, thereby re-establishing the conditions prevailing previously, i. e., thereby re-energizing the previously energized relay 56, the biasing circuit, and the motor 16. Thereafter, the foregoing sequence of events is repeated as long as a positive signal is applied to the grids 49 by the bridge circuit.

Thus, intermittent energization of the reversible motor 16 is attained so that the control valve 15 is moved in a step-by-step manner toward a new position which is determined by the bridge circuit 25. As will be apparent, the length of the current pulses delivered to the motor 16 in the foregoing manner is determined by the time constant of the resistor 69 and the condenser 71 and the frequency of such pulses is determined by the time constant of the entire resistor-condenser network 65.

The hereinbefore described biasing circuit also varies the frequency and length of the current pulses directly with variations in the magnitude of the resultant signal produced by the bridge circuit. In other words, the biasing circuit increases the frequency and length of the current pulses delivered to the motor 16 with an increase in the magnitude of the resultant signal of the bridge circuit, and decreases the frequency and length of the pulses with a decrease in the magnitude of the resultant signal. Considering the manner in which the pulse length is varied directly with variations in signal magnitude, it will be apparent that if the strength of the signal applied to either of the grids 49 increases, the time to decrease the plate current of the duo-triode 43 below the relay drop-out current increases, thereby increasing the pulse length. Similarly, if the strength of the signal applied to the grids increases, the time required to bleed off the negative bias sufficiently to permit the plate current of the duo-triode 43 to re-establish the relay pull-in current decreases so that the interval between pulses decreases, i. e., the pulse frequency increases.

Considering in more detail the function of the variable potential source 62, it will be apparent that it may be employed to increase or decrease the magnitude of the negative bias applied to the grids 49 as desired. Thus, if it is desired to obtain continuous, rather than step-by-step, energization of the motor 16 when a large signal is applied to the grids 49, the variable potential source 62 may be adjusted to limit the maximum negative bias applied to the grids to a value less than the signal applied thereto.

The variable potential source 72 applies to the grids 49 a continuous negative bias which may be varied as desired and which determines the magnitude of the positive signal which must be applied to the grids to cause the plate current of the duo-triode 43 to increase to the relay pull-in current. Thus, by adjusting the variable potential source 72, the duo-triode 43 can be caused to energize either of the relays the moment the bridge circuit becomes even slightly unbalanced or energization of the relays thereof can be delayed until a larger degree of unbalance obtains. In this manner, the sensitivity of the apparatus to bridge circuit unbalance can be regulated.

As previously indicated, an object of the invention is to provide means for changing the position of the control valve 15 manually in the event that this is desired for any reason. To accomplish this purpose, the switch 46 includes two stationary contacts 85 in addition to the previously discussed contact 48, the contacts 85 respectively being connected to the field windings 38 of the reversible motor 16. As will be apparent, if the movable contact 47 of the switch 46 is disengaged from the stationary contact 48, the electronic control circuit 35 will be rendered inoperative so that the motor 16 may be controlled manually. It will also be apparent that the motor 16 may be energized in either direction as desired by moving the movable contact 47 of the switch 46 into engagement with one or the other of the contacts 85.

The above-discussed operation of the electronic control means 35 as caused by the signal emitted by the bridge circuit 25 is of the nature of a proportional floating control, as will be understood by those skilled in the art. In order to achieve the rapid, non-hunting temperature control apparatus, which is the subject of the present invention, the aforementioned anticipator circuits 18 and 19 are provided, said first and second anticipator circuits 18 and 19 being adapted to generate a signal which is imposed upon the output of the primary bridge circuit 25 to modulate the signal emitted by said primary bridge circuit.

The first modulating or anticipator circuit 18 incorporates a first voltage divider circuit 90 which is constituted by the temperature-sensitive resistor 22 and a fixed resistor 92 which is grounded at 94. The temperature-sensitive resistor 22 and the fixed resistor 92 are connected in series with a source of alternating potential by means of leads 93. When the temperature-sensitive resistor 22 is subjected to a variance of the temperature of the air in the inlet duct 11 in which it is located, a corresponding variance in the resistance of said variable temperature-sensitive resistor 22 will be induced therein and the voltage divider circuit 90 will generate a signal which will be delivered to the output of the primary bridge circuit 25 in a manner which will be described in greater detail below.

Connected to the output of the voltage divider circuit 90 is a diode rectifier 105 which is adapted to rectify the alternating potential transmitted by said voltage divider from alternating to direct potential. The rectified potential from the rectifier 105 is delivered to a filter 106 which serves to eliminate any alternating potential ripple from the output of the rectifier 105. The output of the filter 106 is connected with a differentiating circuit 96 which includes a blocking condenser or capacitor 107 having plates 107-a and 107-b and a variable resistor 108 which is connected to a potential source such as a battery 109. A triode 110 has its grid 111 connected to the battery 109 through the variable resistor 108 and the battery 109 thus imposes a constant bias upon the grid 111 through the variable resistor 108. The triode 110 includes a plate 112 and a cathode 113, said plate 112 being connected to a source of alternating current 119-a through the variable tap of a resistor 119 while said cathode 113 is connected to the other side of the potential through a grounded connection and the center tap of the primary 124 of a coupling transformer 125. The secondary 126 of the coupling transformer 125 has one lead grounded while the other lead is connected by a conductor 127 to the output side of the primary bridge circuit 25 by means of its connection to one lead of the secondary 30 of the transformer 29.

The second anticipator, or modulating, circuit 19 includes a second voltage divider circuit 100 which has incorporated therein the temperature-sensitive resistor 23 and a fixed resistance 102 which is grounded at 104. The voltage divider circuit 100 is connected to a suitable alternating current source by leads 103.

Connected to the output of the voltage divider 100 is a diode rectifier 115 which is adapted to rectify the alternating potential fed thereto by the voltage divider 100 and which, in turn, is connected to a filter network 116 which serves to eliminate any alternating potential ripple from the output of the rectifier 115. Connected to the output of the filter network 116 is a differentiating circuit 97 which includes a blocking condenser or capacitor 117 having plates 117-a and 117-b and a variable resistor 118 which is connected to the battery 109. The grid 121 of a triode 120 is connected to the battery 109 through the variable resistance 118 and has thus imposed thereupon a constant bias, the value of which is controllable through the variable resistance 118.

The triode includes a plate 122 and a cathode 123, said plate 122 being connected to the source 119-a of alternating potential through the variable tap of the resistor 119, the other side of the potential being applied through the grounded connection and the center tap of the primary 124 of the coupling transformer 125 to the cathode 123 of the triode 120.

Considering the operation of the anticipator circuit 18 in greater detail, and the manner in which said circuit is adapted to impose a modulating signal upon the output of the primary bridge circuit 25, when the temperature in the duct is unchanging, the resistance of the temperature-sensitive resistor 22 will remain constant and a constant potential will be applied to the plate 107-a of the capacitor 107 by the voltage divider circuit 90. Any variance in the temperature of the air in the duct will cause a corresponding variance in the temperature-sensitive resistor 22 which, in turn, will cause the voltage divider circuit 90 to impose a varying potential upon the plate 107-a of the capacitor 107. The variance of the potential imposed upon the capacitor 107 will cause a corresponding variance in the bias imposed upon the grid 111 of the triode 110 and a signal will be transmitted through the coupling transformer 125 to the output side of the primary bridge circuit 25 to modulate the signal emitted by said primary bridge circuit.

The amplitude of the modulating signal generated by the first anticipator circuit 18 is a function of the amplitude of the temperature change occurring in the duct and sensed by the temperature-sensitive resistor 22 while the polarity of the signal is determined by the direction of the temperature change in the duct.

Considering now in greater detail the function of the differentiating network 96 of the first anticipator circuit 18, when a transient voltage is imposed upon the grid 111 due to a variance in the resistance of the temperature-sensitive element 22, as induced by a corresponding variance in the temperature of the air in the duct, the voltage above that of the bias battery 109 tends to bleed off through the variable resistor 108 or, if the transient voltage has lessened the normal bias, the voltage will tend to build up to that of the bias. In other words, the differentiating network 96 constantly tends to return the bias imposed upon the grid 111 of the triode 110 to the voltage of the bias battery 109 and thus constantly tends to return the first anticipator circuit 18 to a condition wherein no modulating signal is imposed upon the output of the primary bridge circuit 25.

The above-described voltage bleed is accomplished in a well-known manner, the rate of the bleed being a function of the time constant of the capacitor 107 and the resistor 108 after the manner of a differentiating network. However, in our invention the bleed is not an exact function of the time constant in the known differentiating manner and the time constant of the differentiating network 96 can be adjusted by the variable resistor 108 so that the time required for the decay of the transient voltage imposed upon the grid 111 of the triode 110 is equal to the cabin time constant, that is, the time it takes for a temperature change occurring at the duct temperature-sensitive element or the ambient temperature-sensitive element to be sensed by the temperature-sensitive element located in the cabin.

Since the mode of operation of the second anticipator circuit 19 is the same as the mode of operation of the first anticipator 18, it will not be necessary to describe said operation in detail. However, it should be noted that, while the first and second anticipator circuits 18 and 19 are described as having their input sides connected to a source of alternating potential adapted to be rectified and filtered prior to being fed into the differentiating circuits 96 and 97, it is possible to utilize a source of direct potential and thus eliminate the necessity for rectification and filtering. However, we prefer to utilize an alternating potential source rather than a constant direct current source since it is a convenient means of preventing any possible pulse feed-back from the pulsing circuits into the anticipator circuits.

Considering the operation of the first anticipator circuit 18 and the manner in which the signal generated thereby is imposed upon the output of the primary bridge circuit 25, when the voltage divider 90 is in a stable condition, a constant negative bias is maintained upon the grid 111 of the triode 110. But, when the voltage output of the voltage divider circuit 90 is changed by a variance of the resistance of the temperature-sensitive resistor 22 as occasioned by a variance of the temperature of the air in the duct in which it is immersed, the negative bias imposed upon the grid 111 of the triode 110 is correspondingly varied.

If the direction of unbalance of the primary bridge circuit 25 which causes the delivery of a signal to the output side thereof is the same as the direction of unbalance of the first anticipator circuit 18, the modulating signal delivered to the output side of the primary bridge circuit 25 by the first anticipator circuit 18, through the triode 110 and the coupling transformer 125 will increase the magnitude of the signal emitted by the primary bridge circuit. On the contrary, if the signal emitted by the primary bridge circuit 25 is the result of an unbalance of said primary bridge circuit in one direction and the modulating signal emitted by the first anticipator circuit 18 is the result of an unbalance of said circuit in the opposite direction, the modulating signal emitted by the first anticipator circuit 18 will diminish the strength of the signal emitted by the primary bridge circuit 25.

It should be noted that if both of the anticipator circuits 18 and 19 are emitting a modulating signal, a resultant modulating signal will be applied to the output of the primary bridge circuit which is the sum of or the difference between the two signals depending upon whether the first and second anticipator circuits 18 and 19 are respectively unbalanced in the same direction or different directions. When the resultant modulating signal is applied to the output of the primary bridge circuit, the resultant signal is the algebraic sum of the signal emitted by the primary bridge circuit 25 and the resultant modulating signal of the first and second anticipator circuits 18 and 19.

Immediately upon the imposition of the modulating signal upon the output of the primary bridge circuit 25 by either one or both of the anticipator circuits 18 and 19, either one or both of the differentiating circuits 96 and 97 permit the potential imposed upon the grids to bleed off in such a manner that the bias upon the grids is returned to the norm established thereupon by the bias battery 109.

Because of the nature of the circuits in which the temperature-sensitive resistors 21, 22, and 23 are employed, only the characteristics of the resistors are utilized, their absolute values being of no moment. Thus, the necessity for careful calibration and matching of the temperature-sensitive resistors is eliminated. This is an important feature of our invention. Another important aspect of the incorporation of the individual temperature-sensitive resistors 21, 22, and 23 in individual circuits is the fact that such isolation of the individual temperature-sensitive resistors in separate circuits prevents the entire temperature regulating apparatus from being inactivated because of the failure of one of the temperature-sensitive resistors embodied in either of the anticipator circuits 18 or 19. Although the degree of temperature control stability attainable when one of the temperature-sensitive resistors located in the first and second anticipator circuits 18 and 19 has failed will not be as great as that attainable when the temperature-sensitive resistors in both anticipator circuits are functioning properly, nevertheless, a sufficient degree of control will be obtainable to prevent acute discomfort upon the part of the individuals in the aircraft cabin.

It is believed that the over-all operation of the temperature regulating apparatus may be best understood by a consideration of its functioning under typical flight conditions. First, let us assume that a condition of temperature equilibrium obtains, that is, that the air temperature in the ducts 11 to 13 in the cabin 10 and in the ambient air surrounding the cabin are all constant, this being an optimum condition which seldom exists in actual flight since the variables imposed upon the temperature regulating system are subject to continual mutations. However, under such optimum conditions, the primary bridge circuit 25 is in balance so that no signal is delivered to the output thereof and the first anticipator circuit 18 and the second anticipator circuit 19 are quiescent so that a constant negative bias is maintained upon the grids 121 and 111 of the triodes 120 and 110 associated with said anticipator circuits by means of the biasing battery 109.

Therefore, no signal is generated by the primary bridge circuit 25 and no modulating signal is imposed upon the output of the primary bridge circuit by either of the anticipator circuits 18 and 19. Under such conditions, the electronic control circuit 35 is inactive with the result that the motor 16 is de-energized and the control valve 15 is stationary.

Illustrated in Fig. 2 of the drawings is the manner in which our temperature regulating apparatus permits a voluntary change to be rapidly made in the predetermined norm at which the temperature of the air in the cabin is established. Reference should also be made to Fig. 3 of the drawings which is a graph illustrating the manner in which the cumulative effect of the anticipator circuits and the differentiating circuits incorporated therein act to achieve the rapid alteration of the temperature of the cabin with the elimination of the hunting encountered in previous temperature regulating apparatus. For instance, let us presume that the control resistor 26 of the primary bridge circuit 25 has been shifted to cause an increase in the predetermined temperature norm of the cabin from 70° to approximately 100° as illustrated by line F in the graph of Fig. 2 of the drawings. The line G of the graph indicates that to maintain the temperature of the cabin at 70° it was necessary to hold the temperature of the air in the inlet duct at approximately 68°. To achieve the rise of the temperature in the cabin to the newly selected norm of approximately 100° in the rapid manner which is characteristic of our apparatus, the temperature of the air in the inlet duct is increased to a point far above that at which it will be necessary to maintain the air in the inlet duct to hold the desired temperature norm within the cabin, as shown by the line G of the graph of Fig. 2.

Considering the manner in which the temperature regulating apparatus accomplishes the sudden rise of temperature within the cabin to a newly selected predetermined norm, when the primary bridge circuit 25 is thus voluntarily unbalanced by the shifting of the control resistor 26 to a new position, a relatively large signal is delivered to the output 28 of the primary bridge circuit 25 and transmitted through the amplifier 36 to the electronic control circuit 35 to cause the activation of the motor 16 to throttle down the volume of cold air entering the inlet duct 11 and greatly increase the volume of hot air entering said duct. Since the movement of the actuator motor is proportional to the magnitude of the signal imposed upon the electronic control circuit 35 and since a relatively large signal has been imposed upon the electronic control circuit 35 by the unbalance of the primary bridge circuit 25, the temperature of the air in the inlet duct will be sharply raised in order to induce a rapid change in the temperature of the air in the cabin from the previously determined norm of 70° to the newly chosen norm of 100°.

However, the sudden variance in the temperature of the air in the inlet duct will cause a corresponding variance in the resistance of the temperature-sensitive resistor 22 incorporated in the first anticipator circuit 18 and positioned in the inlet duct 11. The resulting unbalance of the first anticipator circuit 18 will be in a direction contrary to the unbalance of the primary bridge circuit 25 and a modulating signal generated by the first anticipator circuit 18 will be imposed through the triode 110 upon the output of the primary bridge circuit 25 to cause the reversal of the actuator motor 16 to correspondingly alter the position of the control valve 15 to sharply reduce the volume of hot air entering the inlet duct 11. Thus, the unbalance of the first anticipator circuit 18 in a direction opposite to the unbalance of the primary bridge circuit 25 causes the modulating signal of the anticipator circuit 18 to diminish the magnitude of the signal generated by the primary bridge circuit by modulating said signal at the output of said primary bridge circuit. Therefore, the modulating effect of the first anticipator circuit 18 causes the rapid return of the valve 15 to a position where the temperature of the air in the inlet duct is held to maintain the temperature of the cabin at the predetermined norm without the hunting encountered in conventional temperature regulating apparatus.

The elimination of hunting of the control valve 15 is achieved by the action of the differentiating circuit 96 which, when the signal caused by the variance of the resistance of the temperature-sensitive resistor 22 in the above-described temperature change causes the imposition of a modulating signal through the triode 110 upon the output of the primary bridge circuit 25, immediately causes the bleeding off of the potential change which has caused an increase or decrease of the bias imposed upon the grid 111 of the triode 110 and causes said bias to return to the norm established by the bias battery 109. Thus, the signal transmitted to the output of the primary bridge circuit 25 is rapidly diminished within a predetermined time established by the setting of the variable resistor 108 to prevent the over-shooting of the control valve 15 and to thus eliminate the hunting encountered in conventional temperature regulating apparatus.

In order to illustrate the manner in which the differentiating circuits 96 and 97 permit the temperature regulating apparatus to maintain the temperature of the cabin at a predetermined norm despite non-voluntary changes in the temperature of the air in the inlet duct or changes in the temperature of the ambient air, let us assume that the air temperature in the cabin is being maintained at 70° F. with a normal requirement of 100° F. air at the inlet duct to maintain that temperature, and that the bridge and anticipator circuits are quiescent. Let us assume further that the temperature of the air in the duct is changed upwardly to 110° F. for any cause. As illustrated in Fig. 3 of the drawings, the temperature-sensitive element 22 located in the duct immediately senses the change in the temperature of the air and causes a transient voltage a—b to appear at the grid 111. Normally, the differentiating network 96 would bleed off the transient voltage imposed upon the grid 111 in the manner indicated by b—c as determined by the R/C time constant. However, since the rise in the temperature of the air in the inlet duct from 100° to 110° F. caused the movement of the control valve 15 to reduce the temperature of the air in the inlet duct to the previously maintained temperature of 100°, the action of the temperature-sensitive element 22 will be immediately reversed with respect to its action in response to the original increase in temperature of the air in the duct since the shifting of the control valve 15 has caused a sharp drop in the temperature of the air in the duct to cause the rapid change of the temperature of said air to forestall a change of temperature in the cabin. In addition to the effect of the grid leak caused by the action of the differentiating circuit 96 to reduce the transient voltage imposed upon the grid 111 of the triode 110, we have the cumulative effect of the grid leak and the reversal of the valve as caused by the change in the unbalance of the temperature-sensitive element 22.

Therefore, if the transient voltage actually achieved a value a—b, it would not bleed off b—c but would follow a curve somewhat on the order of b—d—x. That is, the valve would first move rapidly to a position to admit more cold air and reduce the temperature of the air in the duct as illustrated by b—d and then reverse itself, d—x, and level out to the exact position necessary to admit air of a temperature sufficient to maintain the cabin at its predetermined norm. The reversal of the valve occurs by virtue of the fact that it is rapidly moved initially, under the action of the anticipator circuit, to a position which would allow air of too cold a temperature to be admitted to permit the maintenance of the temperature of the cabin at the predetermined norm.

Although the action of the apparatus has been described as causing the immediate reversal of the control valve 15, it is possible to so change the values of the components of the differentiating circuits that any desired operation of the valve under the aforementioned conditions is obtainable. For instance, under one condition, it is possible for the valve to remain at rest for some time after its initial movement before reversing to the optimum position. In another application, the maximum temperature at the duct outlet might be limited to prevent discomfort to the cabin occupants. In such a case, the cabin temperature would be advanced by stages, that is, by actual step-by-step movements of the valve (as distinguished from the step-by-step movements caused by the pulsing network). The flexibility of operation achieved by the use of the apparatus is an important feature of our invention.

Although we have disclosed an exemplary embodiment of our invention herein for purposes of illustration, it will be understood that various changes, modifications, and substitutions may be incorporated therein and we hereby reserve the right to all such changes, modifications, and substitutions as properly come within the scope of the invention.

We claim as our invention:

1. In an apparatus for regulating the temperature of the air in a chamber having an air inlet duct connected thereto, the combination of: a first bridge circuit for producing a signal; control means for varying the temperature of the air in said duct; electronic means electrically connected to the output side of said first bridge circuit and controlled by said signal thereof for delivering electric current pulses to said control means, said electronic means including means for varying the frequency and length of said electric current pulses directly with variations in the magnitude of said signal; a second circuit electrically connected to the output side of said first bridge circuit to modulate said signal from said first bridge circuit; and a third circuit electrically connected to the output side of said first bridge circuit to modulate the signal from said first bridge circuit.

2. In an apparatus for regulating the temperature of the air in a chamber having an air inlet duct connected thereto, the combination of: a first signal emitting bridge circuit; means for connecting the input side of said first bridge circuit to a source of alternating potential; triode means having a pair of grids and a pair of plates, said grids being connected to the output side of said bridge circuit; means for connecting said plates to a source of alternating potential of the same frequency as the source of alternating potential for said first bridge circuit; a pair of switch means; means in series with each of said plates for operating one of said switch means; a second circuit electrically connected to the output side of said first bridge circuit for generating a signal to modulate said signal of said first bridge circuit; and a third circuit electrically connected to the output side of said first bridge circuit for generating a signal for modulating said signal of said first bridge circuit.

3. In an apparatus for regulating the temperature of the air in a chamber having an air inlet duct connected thereto, the combination of: a first bridge circuit; means for connecting the input side of said first bridge circuit to a source of alternating potential; triode means having a pair of grids and a pair of plates; means for connecting said grids to the output side of said first bridge circuit; means for connecting said plates to a source of alternating potential of the same frequency as the source of alternating potential for said bridge circuit; a pair of switch means; means in series with each of said plates and energizable by a flow of plate current for closing one of said switch means; means controlled by said switch means for applying an increasing negative potential to said grid; a second circuit; means for connecting the input side of said second circuit to a source of alternating potential; means for connecting the output side of said second circuit to the output side of said first bridge circuit; a third circuit; means for connecting the input side of said third circuit to a source of alternating potential; and means for connecting the output side of said third circuit to the output side of said first bridge circuit.

4. In an apparatus for regulating the temperature of the air in a chamber having an air inlet duct communicating therewith, the combination of: a primary signal emitting bridge circuit; electronic control means adapted to be activated by said signal emitted by said primary bridge circuit; an actuator energizable in one of two directions by the activation of said electronic control means; control means for regulating the temperature of the air in said duct, said control means being operatively connected to said actuator; a signal emitting anticipator circuit; means for connecting the input side of said anticipator circuit to a source of alternating potential; voltage divider means at the input side of said anticipator circuit; rectifier means connected to said voltage divider means; capacitor means electrically connected to the output side of said rectifier means; and grid controlled means connecting the output side of said capacitor means with said bridge circuit, said voltage divider means being adapted to impose a potential upon said grid means through said rectifier means and said capacitor means, when in an unbalanced condition, to cause the generation of a signal which will modulate the signal generated by said primary bridge circuit.

5. In an apparatus for regulating the temperature of the air in a chamber having an air inlet duct communicating therewith, the combination of: a primary signal emitting bridge circuit; an electronic control circuit electrically connected to the output of said primary bridge circuit; a first anticipator circuit having an input side and an output side; a second anticipator circuit having an input side and an output side; first triode means having a grid connected to the input of said first anticipator circuit; second triode means having a grid connected to the input of said second anticipator circuit; and means electrically connecting said first and second triode means to the output side of said primary bridge circuit to permit the modulation of the signal generated by said primary bridge circuit by a signal generated by said first and second anticipator circuits.

6. In an apparatus for regulating the temperature of the air in a chamber having an air inlet duct communicating therewith, the combination of: a primary signal emitting bridge circuit having an output connection; an electronic control circuit connected to the output of said primary bridge circuit; a first signal emitting anticipator circuit having input and output sides; a second signal emitting anticipator circuit having input and output sides; a first triode means having a grid electrically connected to the input of said first anticipator circuit; second triode means having a grid electrically connected to the input of said second anticipator circuit; and a source of alternating potential electrically connected to said first and second triode means, said source of alternating potential being so balanced as to prevent the emission of a signal by said first and second triode means when the grids thereof are maintained at a constant bias.

7. In an apparatus for regulating the temperature of the air in a chamber having an air inlet duct communicating therewith, the combination of: a primary signal emitting bridge circuit having an output connection; means for connecting the input side of said bridge circuit to a source of alternating potential; a first signal emitting anticipator circuit; means for connecting the input side of said first anticipator circuit to a source of potential; a second signal emitting anticipator circuit; means for connecting the input side of said second anticipator circuit to a source of potential; first triode means having a control grid electrically connected to the input side of said first anticipator circuit; second triode means having a control grid electrically connected to the input side of said second anticipator circuit; and other means electrically connecting said first and second triode means to a source of alternating potential, said other means being electrically balanced to prevent the emission of a signal through said first and second triode means when said grids are maintained at a predetermined bias, and being electrically connected to the output of said primary bridge circuit to permit the modulation of the signal of said primary bridge circuit by a signal transmitted by said first and second triode means.

8. In an apparatus for regulating the temperature of the air in a chamber having an air inlet duct communicating therewith, the combination of: a first signal generating means having an output signal circuit, said output signal being controlled by a temperature-sensitive element responsive to variations of the temperature in said chamber from a predetermined norm; a second signal generating means including a temperature-sensitive element for generating a signal varying with a variance in the temperature of the air in said duct which would cause a variance of the temperature of said air in said chamber, said second signal generating means being electrically connected to the output circuit of said first signal generating means to modulate the signal generated thereby; a third signal generating means including a temperature-sensitive element for generating a signal varying with a variance of the temperature in ambient air which would cause a variance of said temperature of said air in said chamber, said third signal generating means being electrically connected to the output circuit of said first signal generating means to modulate the signal generated thereby; control means for varying the temperature of air in said duct; and electronic means electrically connected to said control means controlled by said modulated signal for actuating said control means.

9. Apparatus for regulating a chamber temperature, comprising: a primary signal emitting bridge circuit variable in accordance with chamber temperature changes; means for supplying a temperature changing medium to said chamber; a chamber temperature change anticipator signal emitting circuit variable in accordance with the temperature of said medium prior to its entering said chamber; and means for controlling said supply means including a signal responsive element; and transformer means having secondary coils connected in circuit with said signal responsive element, and energized by signals from said bridge circuit and said anticipator circuit.

10. Apparatus for regulating a chamber temperature, comprising: a primary signal emitting bridge circuit variable in accordance with chamber temperature changes; means for supplying a temperature changing medium to said chamber; means varying the temperature of said medium prior to its entering said chamber; a chamber temperature change anticipator signal emitting circuit variable in accordance with the temperature of said medium prior to its entering said chamber; and means for controlling said medium temperature varying means including a signal responsive element; and transformer means having secondary coils connected in circuit with said signal responsive element energized by signals from said bridge circuit and said anticipator circuit.

11. Apparatus for regulating a chamber temperature comprising: a primary signal emitting bridge circuit variable in accordance with chamber temperature changes; means for supplying a temperature changing medium to said chamber; means varying the temperature of said medium prior to its entering said chamber; a plurality of chamber temperature change anticipator signal emitting circuits, the signal of one of said circuits being variable in accordance with the temperature of said medium before change of its temperature, and the signal of another of said circuits being variable in accordance with the temperature of said medium after its change of temperature, but before entering said chamber; means for controlling said medium temperature varying means including a signal responsive control element; and inductive coupling means with said bridge circuit and anticipator circuits including secondary coils in circuit with said signal responsive element.

12. Apparatus for regulating a chamber temperature, comprising: a primary signal emitting bridge circuit variable in accordance with chamber temperature changes; a transformer having a primary winding connected in said bridge circuit, and a secondary winding; means for supplying a temperature changing medium to said chamber; means for varying the temperature of said medium prior to its entering said chamber; a pair of chamber temperature change anticipator signal emitting circuits each containing a control tube having a grid, plate and cathode, said grids being respectively connected with potential sources variable in accordance with the temperature of said medium on opposite sides of said means for varying the medium temperature; a transformer having a center tapped primary winding connected between the cathodes of said tubes, and a secondary winding; a resistor connected between the plates of said tubes, having an adjustable contact; a source of alternating potential connected between said contact and said primary center tap; and means for controlling said medium temperature varying means including a control circuit containing the secondary windings of said transformers.

13. In apparatus for regulating a chamber temperature, comprising: a primary signal emitting bridge circuit variable in accordance with chamber temperature changes; means for supplying a temperature changing medium to said chamber; means normally controlled by variations in the emitted signal from said bridge circuit for controlling supply of said medium to said chamber; a signal emitting anticipator circuit; electronic means in said anticipator circuit electrically connected with the output of said bridge circuit and having a control grid; means for applying a bias modifying potential to said grid depending upon the temperature of said medium prior to its entering said chamber; and resistor-capacitor bleeder means acting to restore said normal bias.

14. In apparatus for regulating a chamber temperature, comprising: a primary signal emitting bridge circuit variable in accordance with chamber temperature changes; means for supplying a temperature changing medium to said chamber; means normally controlled by variations in the emitted signal from said bridge circuit for controlling supply of said medium to said chamber; a signal emitting anticipator circuit; electronic means in said anticipator circuit electrically connected with the output of said bridge circuit and having a control grid; a bias modifying circuit for applying a potential to said grid depending upon the temperature of said medium prior to its entering said chamber; and resistor-capacitor means in said bias modifying circuit for bleeding-off said potential at a rate corresponding with the time required for said bridge circuit to sense a temperature change resulting from supply of temperature changing medium to said chamber.

References Cited in the file of this patent

UNITED STATES PATENTS

| | | |
|---|---|---|
| 2,282,726 | Jones | May 12, 1942 |
| 2,403,917 | Gille | July 16, 1946 |
| 2,423,541 | Wilson et al. | July 8, 1947 |
| 2,474,441 | Sparrow | June 28, 1949 |
| 2,487,556 | Jenkins | Nov. 8, 1949 |
| 2,490,919 | Raney | Dec. 13, 1949 |
| 2,531,413 | Dionne | Nov. 28, 1950 |
| 2,544,031 | Hyle | Mar. 6, 1951 |
| 2,556,065 | Callendar | June 5, 1951 |